(12) United States Patent
Wu (10) Patent No.: US 9,338,711 B2
(45) Date of Patent: May 10, 2016

(54) METHOD OF HANDLING HANDOVER FOR NETWORK OF WIRELESS COMMUNICATION SYSTEM AND COMMUNICATION DEVICE THEREOF

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 14/519,154

(22) Filed: Oct. 21, 2014

(65) Prior Publication Data

US 2015/0111580 A1   Apr. 23, 2015

Related U.S. Application Data

(60) Provisional application No. 61/893,299, filed on Oct. 21, 2013.

(51) Int. Cl.
*H04W 36/08* (2009.01)
*H04W 36/00* (2009.01)
*H04W 88/06* (2009.01)
*H04W 76/06* (2009.01)

(52) U.S. Cl.
CPC .......... *H04W 36/08* (2013.01); *H04W 36/0005* (2013.01); *H04W 88/06* (2013.01); *H04W 76/064* (2013.01)

(58) Field of Classification Search
CPC ..................................................... H04W 36/08
USPC ......................................................... 455/436
See application file for complete search history.

(56) References Cited

U.S. PATENT DOCUMENTS

2013/0242907 A1 *   9/2013   Kang et al. .................... 370/329
2014/0004863 A1 *   1/2014   Zhang et al. .................. 455/444

FOREIGN PATENT DOCUMENTS

WO          2015002477 A1      1/2015

OTHER PUBLICATIONS

European Search report issued on Mar. 9, 2015 for EP application No. 14189718.1.
Pantech, "Comparing PDCP split (1A/2A) and RLC split (2C) for impacts on SN status transfer and data forwarding during inter-MeNB HO", 3GPP TSG-RAN WG2 Meeting#83bis, R2-133552, Oct. 7-11, 2013, Ljubljana, Slovenia, XP050728556, pp. 1-5.
Intel Corporation, "Detailed signaling procedure for dual connectivity", 3GPP TSG-RAN2 Meeting #83bis, R2-133491, Oct. 7-11, 2013, Ljubljana, Slovenia, XP050719207, pp. 1-5.
(Continued)

*Primary Examiner* — Michael Neff
(74) *Attorney, Agent, or Firm* — Winston Hsu; Scott Margo (57) ABSTRACT

A method of handling handover for a network of a wireless communication system, wherein a user equipment (UE) is connected to at least one first cell of a master base station and at least one second cell of a secondary base station of the network, includes when the master base station decides to hand over the UE to a target master base station of the network, transmitting, by the master base station, a first message to the secondary base station to instruct the secondary base station to release the at least one second cell.

12 Claims, 7 Drawing Sheets

(56) References Cited

OTHER PUBLICATIONS

3GPP TR 36.842 V0.4.0 (Oct. 2013), "3rd Generation Partnership Project; Technical Specification Group Radio Access Network; Evolved Universal Terrestrial Radio Access (E-UTRA); Study on Small Cell Enhancements for E-UTRA and E-UTRAN-Higher layer aspects (Release 12)", pp. 1-52.

3GPP TS 36.300 V11.7.0 (Sep. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", pp. 1-209.

3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC) protocol specification (Release 11)", pp. 1-57.

* cited by examiner

METHOD OF HANDLING HANDOVER FOR NETWORK OF WIRELESS COMMUNICATION SYSTEM AND COMMUNICATION DEVICE THEREOF

CROSS REFERENCE TO RELATED APPLICATIONS

This application claims the benefit of U.S. Provisional Application No. 61/893,299, filed on Oct. 21, 2013 and entitled "Method and Apparatus for performing handover in inter-node radio resource aggregation in a wireless communication system", the contents of which are incorporated herein by reference.

BACKGROUND OF THE INVENTION

1. Field of the Invention

The present invention relates to a method utilized in a wireless communication system and a communication device thereof, and more particularly, to a method of handling handover for a network of a wireless communication system and a communication device thereof.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques such as carrier aggregation (CA), coordinated multipoint (CoMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A term "dual connectivity" refers to an operation where a given UE consumes radio resources provided by at least two different network points connected with a non-ideal or ideal backhaul (e.g. X2 interface). Furthermore, each eNB involved in the dual connectivity for a UE may assume different roles. These roles do not necessarily depend on the eNB's power class and can vary among UEs. In dual connectivity, (i.e., an inter-node radio resource aggregation, inter-eNB carrier aggregation or inter-eNB radio resource aggregation), the UE receives a plurality of data blocks from a master eNB (hereinafter MeNB) on at least one first component carrier (CC) and from a secondary eNB (hereinafter SeNB) on at least one second CC, and transmits a plurality of data blocks to the MeNB on the at least one first CC and/or to the SeNB on the at least one second CC.

A UE in dual connectivity may be involved in a handover. For example, the UE is simultaneously served by a MeNB and a SeNB in a dual connectivity mode. When receiving a measurement report from the UE, the MeNB may make a decision to hand over the UE to a target MeNB. During the handover procedure, the UE deactivates all cells of the MeNB. However, the SeNB may continue transmitting data blocks to the UE or receiving data blocks from the UE since the SeNB does not know the MeNB is initiating the handover for the UE. During handover, the UE derives a new key for data transmission and reception. However, the data blocks transmitted by the SeNB may be ciphered with an original key. Thus, the UE uses the new key to decipher the data blocks ciphered by the original key, and will fail to correctly decipher the data blocks. Thus, there is a need for improvement over the prior art.

SUMMARY OF THE INVENTION

It is therefore an objective of the present invention to provide a method of handling handover for a network of a wireless communication system and a communication device to solve the abovementioned problem.

An embodiment of the present invention discloses a method of handling handover for a network of a wireless communication system, wherein a user equipment (UE) is connected to at least one first cell of a master base station and at least one second cell of a secondary base station of the network. The method comprises when the master base station decides to hand over the UE to a target master base station of the network, transmitting, by the master base station, a first message to the secondary base station to instruct the secondary base station to release the at least one cell.

An embodiment of the present invention further discloses a method of handling handover for a network of a wireless communication system, wherein a UE is connected to at least one first cell of a master base station and at least one second cell of a secondary base station of the network. The method comprises when the master base station decides to hand over the UE to a target master base station of the network, transmitting, by the master base station, a first message to the secondary base station to instruct the secondary base station to stop a transmission to the UE.

An embodiment of the present invention further discloses a communication device for handling handover for a network of a wireless communication system, wherein a UE is connected to at least one first cell of a master base station and at least one second cell of a secondary base station of the network. The communication device is installed in the master base station and comprises a processing means and a storage unit. The processing means is utilized for executing a process corresponding to a program code. The storage unit, coupled to the processing means, is utilized for storing the program code, wherein the process comprises: when the master base station decides to hand over the UE to a target master base station of the network, transmitting a first message to the secondary base station to instruct the secondary base station to release the at least one second cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
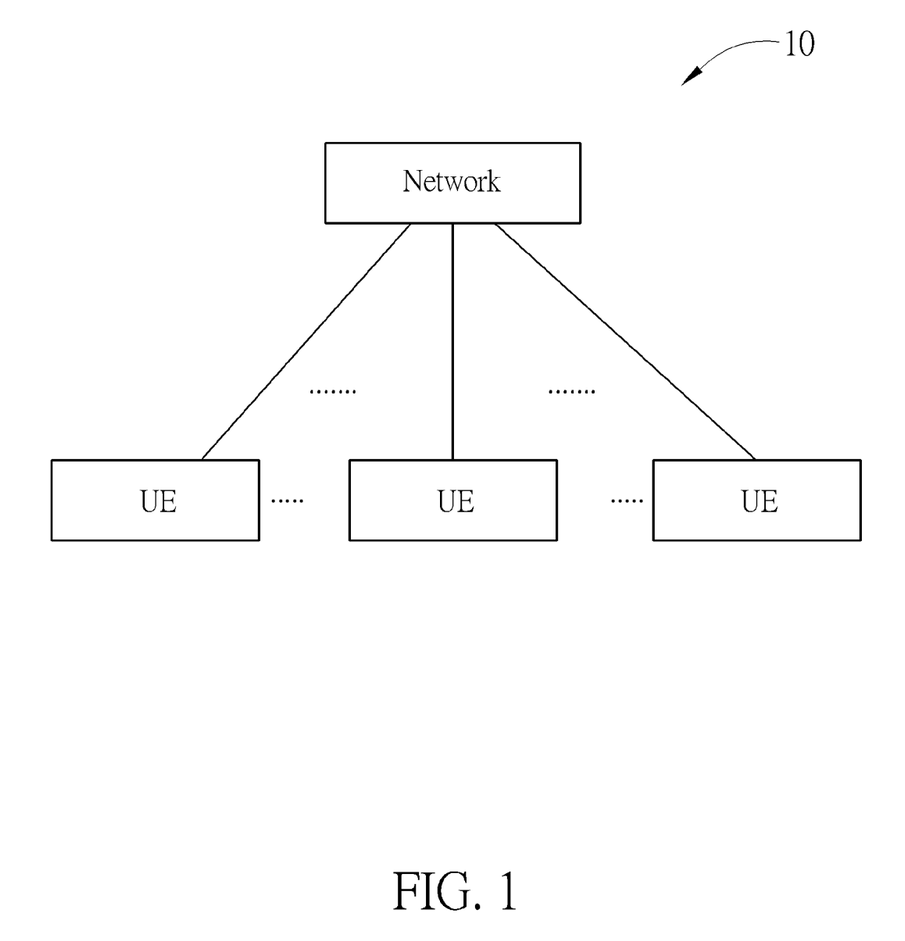
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is a LTE/LTE-Advanced system or other mobile communication systems, and is briefly composed of a network and a plurality of user equipments (UEs). In FIG. 1, the network and the UE are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as a Mobility Management Entity (MME), Serving Gateway (S-GW), Packet Data Network (PDN) Gateway (P-GW), Self-Organizing Network (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system but is not limited. In addition, the network and the UE can be seen as a transmitter or a receiver according to direction, e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Figure 2:
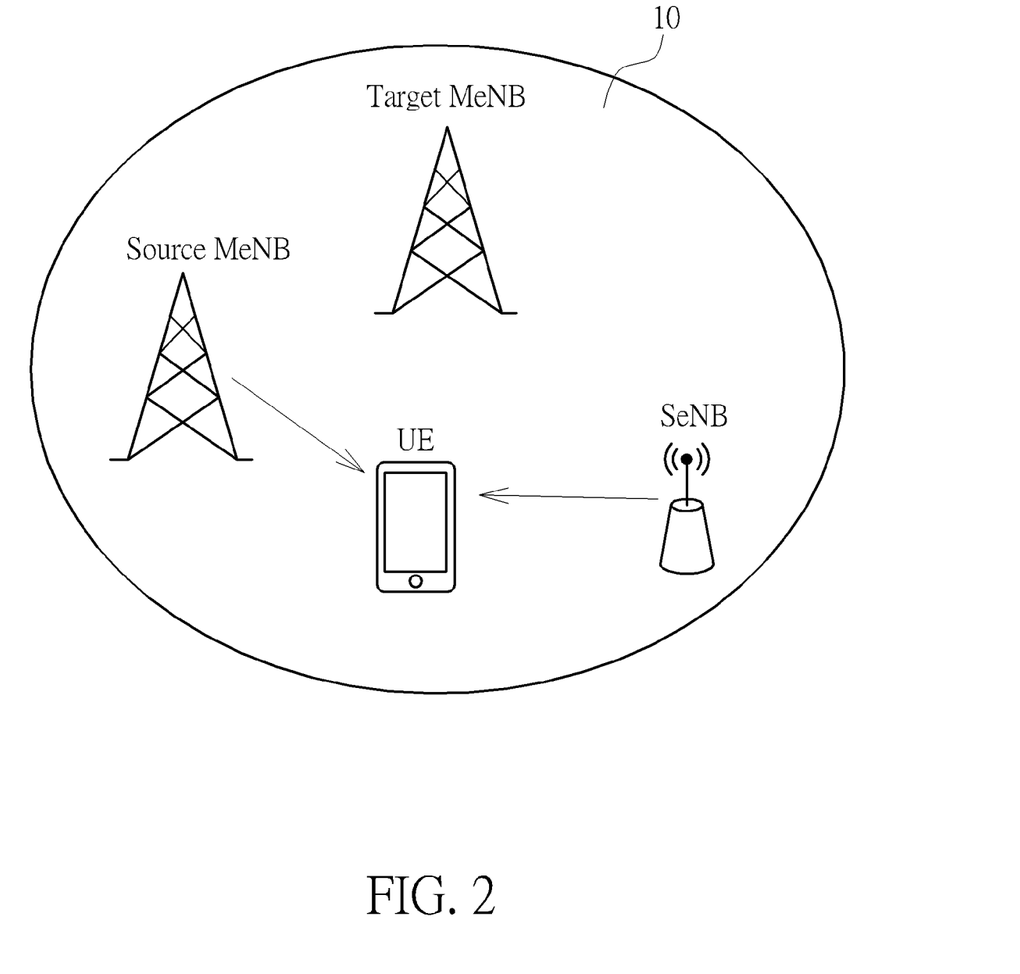
FIG. 2 is a schematic diagram of dual connectivity in the wireless communication system according to an embodiment of the present invention.

Please refer to FIG. 2, which is a schematic diagram of dual connectivity in the wireless communication system 10 according to an embodiment of the present invention. As shown in FIG. 2, the network includes three base stations, i.e. two MeNBs including a source MeNB and a target MeNB, and a SeNB. In dual connectivity, the UE is simultaneously served by the source MeNB and the SeNB. At least S1-MME is terminated at the source MeNB and therefore the source MeNB acts as a mobility anchor towards the core network including a MME. On the other hand, the SeNB provides additional radio resources for the UE. For example, DL data blocks may be transmitted to the SeNB and forwarded to the UE by the SeNB via the radio resources of the SeNB. Depending on user-plane architecture, the DL data blocks may be transmitted to the SeNB by the MeNB or a Serving Gateway. Note that, FIG. 2 is simply utilized for illustrating the structure of the dual connectivity, where the numbers of UEs and eNBs are not limited herein. The source MeNB may hand over the UE to the target MeNB. After the handover is completed, the UE is served by the target MeNB, and the target MeNB may also request the SeNB or other eNBs to provide radio resources for data transmission. The SeNB schedules the UE for data reception on a first component carrier (CC) and/or data transmission on a second CC after receiving the request. The first CC and second CC can be the same CC or different CCs.

Figure 3:
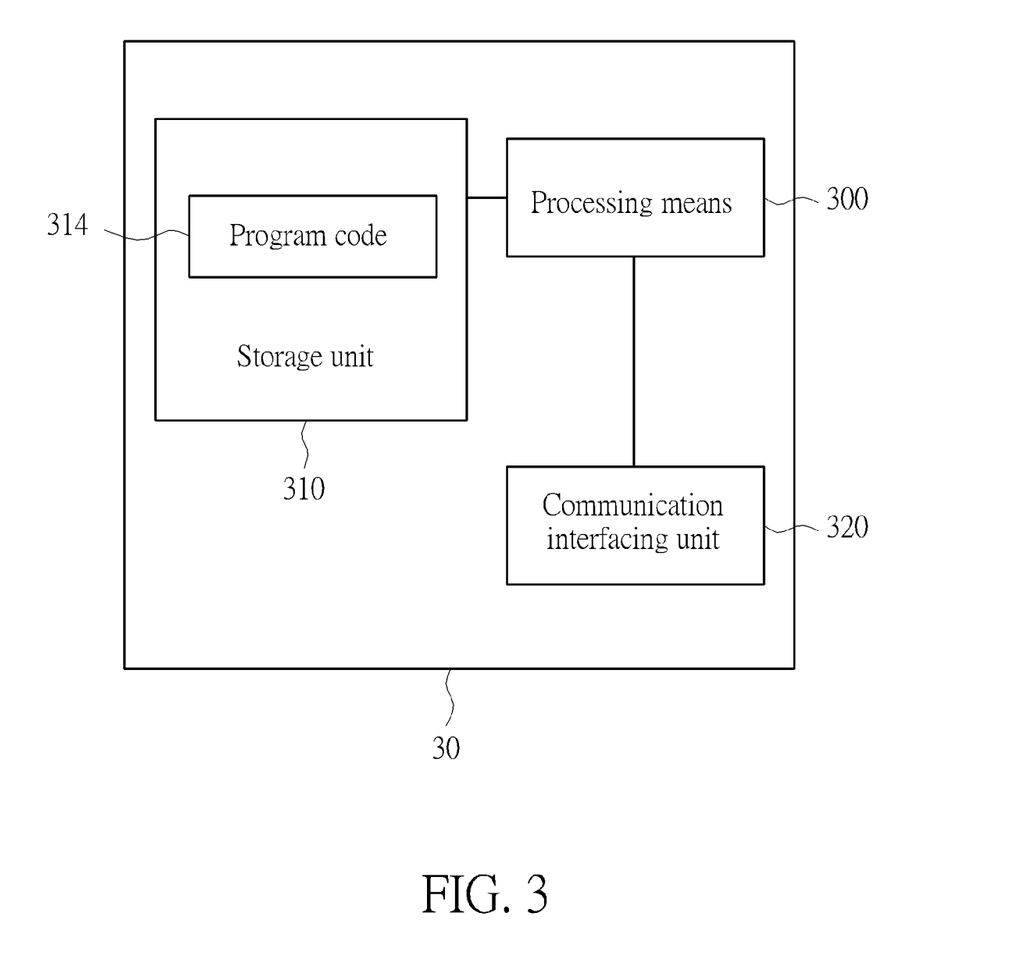
FIG. 3 is a schematic diagram of a communication device according to an example of the present invention.

Please refer to FIG. 3, which is a schematic diagram of a communication device 30 according to an example of the present invention. The communication device 30 may be utilized for realizing the source MeNB, the target MeNB or the SeNB shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g. messages or packets) according to processing results of the processing means 300.

Figure 4:
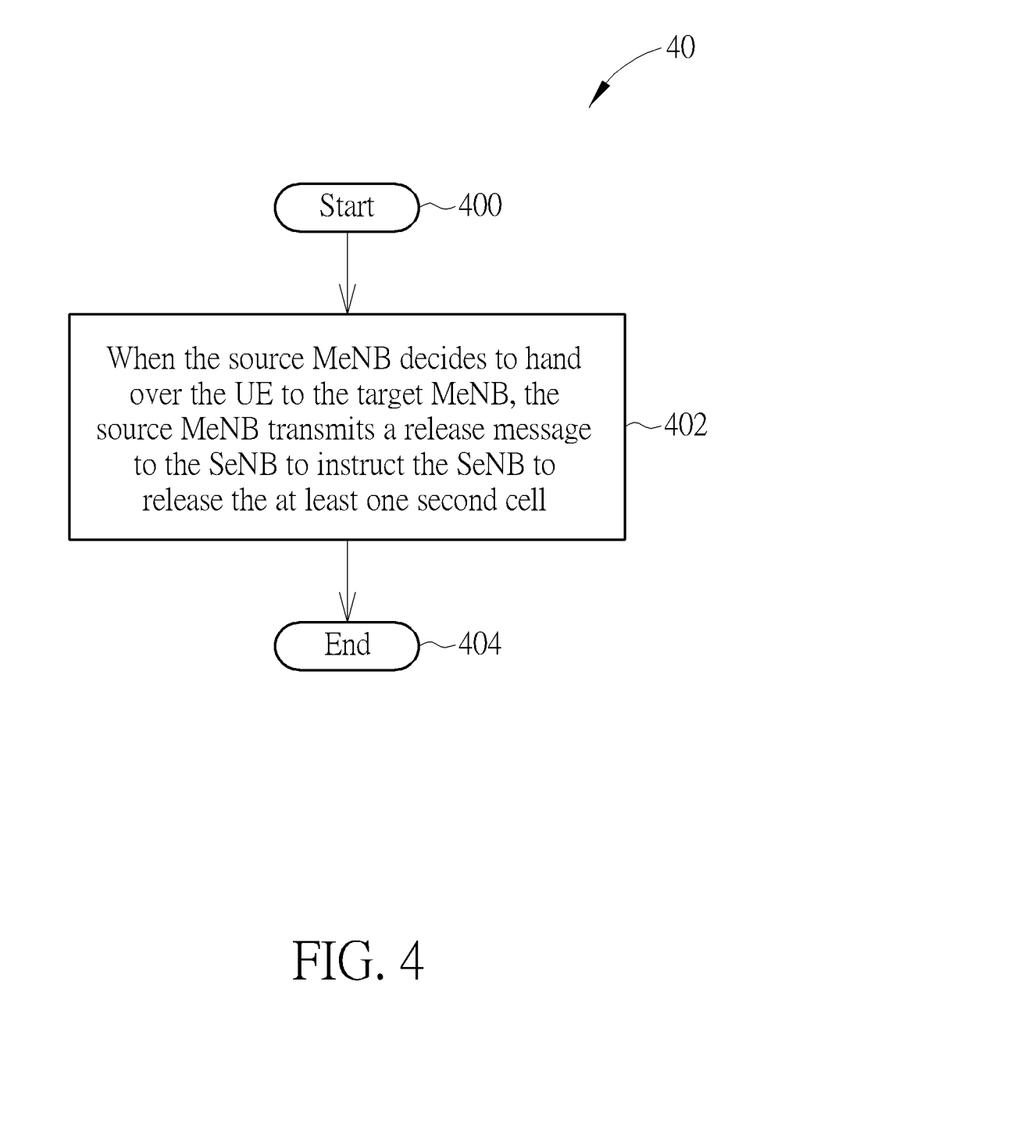
FIG. 4 is a flowchart of a process according to an embodiment of the present invention.

Please refer to FIG. 4, which is a flowchart of a process 40 according to an embodiment of the present invention. The process 40 may be utilized in the network of the wireless communication system 10 shown in FIG. 1 and FIG. 2 for handling handover, wherein the UE is connected to at least one first cell of the source MeNB and at least one second cell of the SeNB of the network shown in FIG. 2. The process 40 may be compiled into the program code 314 and includes the following steps:

Step 400: Start.

Step 402: When the source MeNB decides to hand over the UE to the target MeNB, the source MeNB transmits a release message to the SeNB to instruct the SeNB to release the at least one second cell.

Step 404: End.

According to the process 40, when the source MeNB decides to hand over the UE to the target MeNB, the source MeNB may transmit a release message to the SeNB, to instruct the SeNB to release the at least one second cell, wherein the release message indicates that a handover occurring in the UE. Different from the prior art where the SeNB does not know the MeNB is initiating the handover of the UE, in the embodiment of the present invention, the source MeNB transmits a message to the SeNB to notify the SeNB of the handover procedure. The SeNB releases the at least one second cell in response to receiving the release message. After the SeNB releases the at least one second cell, the SeNB may stop transmitting data to the UE and schedule the UE. In other words, the SeNB may not transmit a DL assignment and an UL grant to the UE via a physical downlink control channel (PDCCH) of the at least one second cell of the SeNB. The following examples are to illustrate the operating principle of the process 40.

Figure 5:
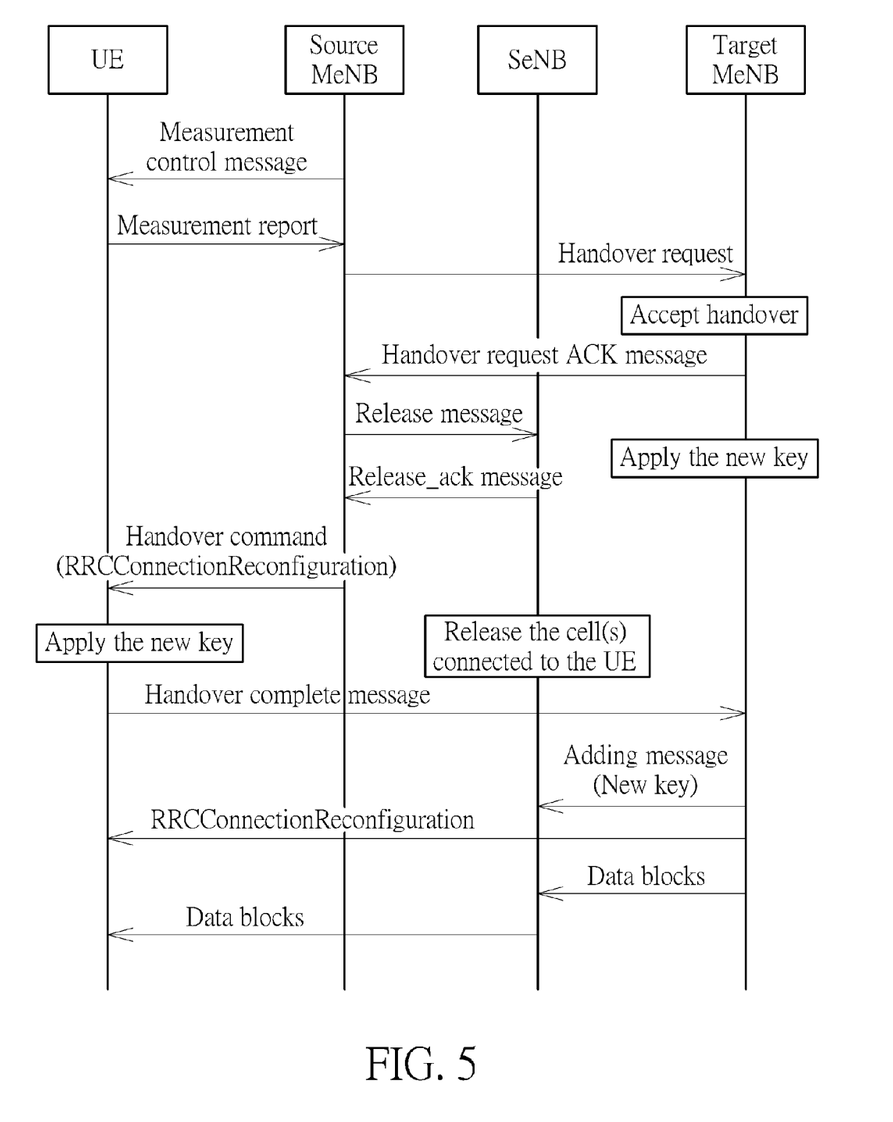
FIG. 5 is a schematic diagram of a handover procedure according to an embodiment of the present invention.

Please refer to FIG. 5, which is a schematic diagram of a handover procedure 50 according to an embodiment of the present invention. As shown in FIG. 5, the UE is connected to and served by the source MeNB and the SeNB simultaneously according to dual connectivity. The source MeNB may transmit a measurement control message to the UE to instruct the UE to perform measurement reporting. The UE then performs measurement and transmits a measurement report to the source MeNB according to the measurement control message. After receiving the measurement report, the source MeNB may make a decision to perform handover for the UE or not. For example, if the measurement report indicates that signal strength measured from signal transmitted by the target MeNB is stronger than signal strength measured from signal transmitted by the source MeNB, the source MeNB may decide to hand over the UE to the target MeNB. The source MeNB then transmits a handover request message to the target MeNB, wherein the handover request message includes necessary information including at least one of UE X2 signalling context reference at source MeNB, UE S1 evolved packet core (EPC) signalling context reference, target cell ID, eNB key (KeNB), radio resource control (RRC) context including the cell radio network temporary identifier (C-RNTI) of the UE in the source MeNB, active serial (AS) configuration, E-UTRAN radio access bearer (E-RAB) context, and physical layer ID of the source cell and short MAC-I for possible radio link failure (RLF) recovery for preparing the handover in the target MeNB. The target MeNB may accept the handover request and reply to the source MeNB with a handover request acknowledge (ACK) message. The handover request ACK message includes a transparent container to be sent to the UE as an RRC message (i.e., the handover command, e.g., RRCConnectionReconfiguration including mobilityControlInformation) to perform the handover. The transparent container or the RRC message may include a new C-RNTI, target cell identity, carrier frequency, target eNB security algorithm identifiers for the selected security algorithms, a dedicated random access channel (RACH) preamble, access parameters, and/or system information blocks (SIBs). After receiving the handover request ACK message, the source MeNB may transmit the release message to the SeNB to instruct the SeNB to release (or remove) the at least one second cell configured to the UE. After releasing the at least one second cell, the transmission between the SeNB and the UE may not be performed.

The source MeNB may transmit a handover command (e.g., an RRCConnectionReconfiguration message including mobilityControlInformation) to the UE. In the handover command, necessary integrity protection and ciphering of messages are incorporated, and the UE receives the handover command with necessary parameters (e.g., the C-RNTI, security algorithm identifiers for the target MeNB, dedicated random access preamble, and/or SIBS of the target MeNB, etc.), and is commanded by the source MeNB to perform the handover. After receiving the handover command, the UE performs synchronization procedure to the target MeNB via at least one target cell of the target MeNB. The synchronization procedure may be a random access procedure. The UE transmits a random access preamble to the target MeNB. The random access procedure may be a contention-free random access procedure if a dedicated random access preamble was indicated in the mobilityControlInformation, or a contention-based procedure if no dedicated random access preamble was indicated. The UE receives timing advance in response to the random access preamble from the target MeNB. Besides, the UE derives a new key for communicating with the target MeNB. If security algorithm changes, the UE will configure the security algorithm to be used in communication with the target MeNB. In other words, the UE applies the new key for data communication with the target MeNB. In an example, the UE applies the new key by directly using the new key for ciphering (or encrypting) data transmitted to the target MeNB and/or for deciphering (or decrypting) data received from the target MeNB. In another example, the UE applies the new key by deriving a key from the new key for ciphering (or encrypting) data transmitted to the target MeNB and/or for deciphering (or decrypting) data received from the target MeNB. Since the SeNB does not transmit any data to the UE after releasing the at least one second cell, the problem that the UE uses the new key to decipher the data block ciphered by the original key may not occur. When the UE has successfully accessed the cell of the target MeNB, the UE may transmit a handover complete message (e.g. an RRCConnectionReconfigurationComplete message) to the target MeNB to confirm the handover. The target MeNB then begins transmitting data to the UE.

Please note that the source MeNB may transmit the handover command after receiving the handover request ACK message from the target MeNB, after transmitting the release message to the SeNB, or after receiving an acknowledgement message from the SeNB in response to the release message, and the handover command may instruct the UE to remove the at least one second cell of the SeNB. After the UE removes the at least one second cell from its configured cell list in response to the handover command, the UE will not receive any data block via the at least one second cell until the UE adds any of the at least one second cell again. In an embodiment, the release message may instruct the SeNB to release all of the at least one second cell configured to the UE (i.e. the SeNB is released). In this case, the SeNB is no longer communicating with the UE. In another embodiment, in response to receiving the release message, the SeNB may reply to the source MeNB with an acknowledgement message (i.e., a release_ack message in FIG. 5) to acknowledge a reception of the release message. Preferably, the source MeNB may transmit the handover command after receiving the acknowledgement message (i.e., release_ack message). It should be noted that, before the source MeNB transmits the handover command to the UE, the source MeNB should ensure that the SeNB does not perform any transmission to the UE. In contrast, if the UE still receives data block(s) from the SeNB during the handover procedure (e.g. after the UE receives the handover command), the UE may likely use the new key to decipher the data block(s) ciphered by the original key, and thus fail to obtain the correct data. In this case, the data block(s) may be discarded.

In an embodiment, after the handover procedure, the target MeNB may also request the SeNB or another eNB to provide radio resources for data transmission according to dual connectivity. As shown in FIG. 5, the target MeNB transmits an addition message to the SeNB to indicate that the UE will access the cell(s) of the SeNB for data transmission or data reception. The addition message may include necessary information for the SeNB to perform data transmission or reception with the UE. For example, the target MeNB may include parameters related to the new key in the addition message, so that the SeNB can use the new key to cipher the data blocks to be transmitted. The parameters may include the new key or may be used to derive the new key. The target MeNB then transmits another RRCConnectionReconfiguration message to the UE instruct the UE to add the cell(s) of the SeNB in its configured cell list. Correspondingly, this RRC-ConnectionReconfiguration message may also include necessary information related to data transmission between the UE and the SeNB. Therefore, the UE may perform a synchronization procedure to the SeNB via the cell(s) of the SeNB. The synchronization procedure may be a random access procedure. The UE transmits a preamble to the SeNB. The random access procedure may be a contention-free random access procedure if a dedicated random access preamble was indicated in the mobilityControlInformation, or a contention-based procedure if no dedicated preamble was indicated. The UE receives a timing advance in response to the preamble from the SeNB. After the random access procedure, the SeNB then begins data transmission to the UE, wherein the transmitted data blocks can correctly be deciphered by the UE with the new key, the other new key or the derived key. The SeNB is replaced by the other SeNB in the description above if the target MeNB requests the other SeNB to provide radio resources for data transmission instead of the SeNB.

Realization of the process 40 is not limited to the above description.

For example, in the above embodiments, the release message is transmitted after the source MeNB receives the handover request ACK message from the target MeNB, so that the source MeNB can ensure that the target MeNB accepts the handover request from the source MeNB before the release message is transmitted. In another embodiment, the source MeNB may transmit the release message to the SeNB before transmitting the handover request message to the target MeNB or before receiving the handover request ACK message from the target MeNB. If the release message is transmitted before the source MeNB transmits the handover request message or receives the handover request ACK message and the target MeNB rejects the handover request from the source MeNB, the source MeNB may transmit another message to the SeNB to add the released cell(s) to the UE. In addition, in another embodiment, the target MeNB may transmit a release message to the SeNB in response to the reception of the handover request message from the source MeNB so that the source MeNB does not need to transmit a release message. In other words, via the handover request message, the source MeNB may request the target MeNB to notify the SeNB of the handover; this is not limited herein.

Figure 6:
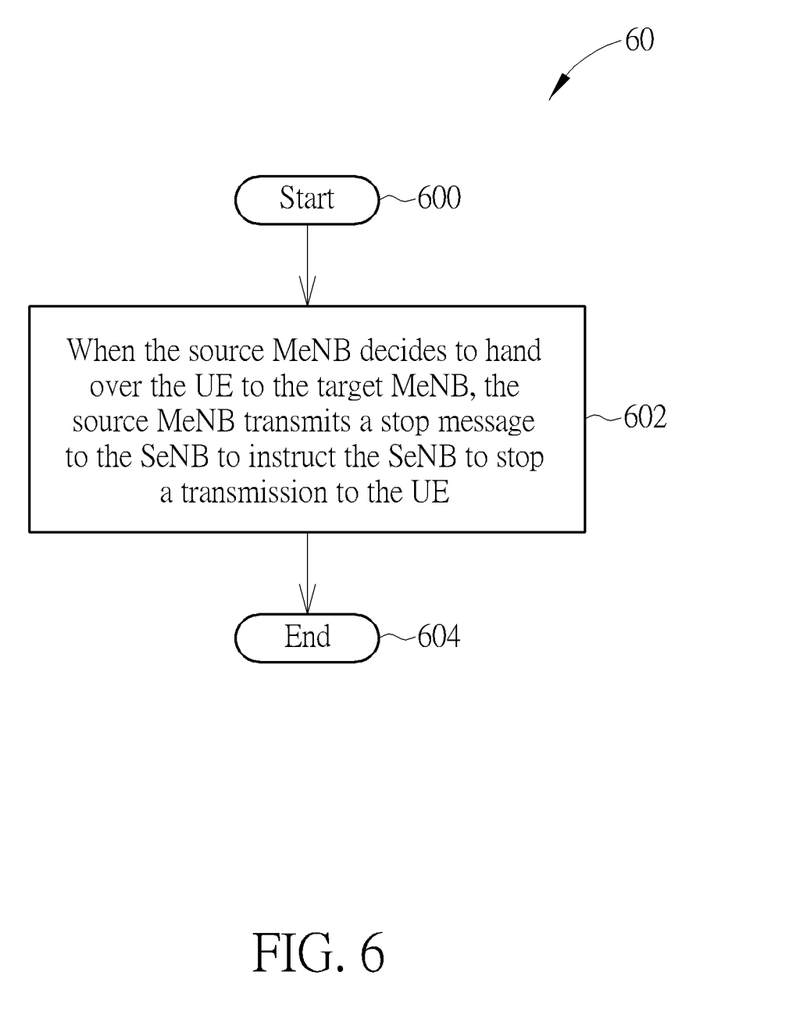
FIG. 6 is a flowchart of a process according to an embodiment of the present invention.

Please refer to FIG. 6, which is a flowchart of a process 60 according to an embodiment of the present invention. The process 60 may be utilized in the network of the wireless communication system 10 shown in FIG. 1 and FIG. 2 for handling handover, wherein the UE is connected to at least one first cell of the source MeNB and at least one second cell of the SeNB of the network shown in FIG. 2. The process 60 may be compiled into the program code 314 and includes the following steps:

Step 600: Start.

Step 602: When the source MeNB decides to hand over the UE to the target MeNB, the source MeNB transmits a stop message to the SeNB to instruct the SeNB to stop a transmission to the UE.

Step 604: End.

According to the process 60, when the source MeNB decides to hand over the UE to the target MeNB, the source MeNB may transmit a stop message to the SeNB, in order to instruct the SeNB to stop or suspend transmission to the UE. The stop message may include the UE identity so that the SeNB knows to which UE to stop transmission. The stop message may further indicate occurrence of a handover for the UE or configuration such as related to security operation (e.g., related to a new key for ciphering and/or deciphering) and/or other configuration indicating stop or suspension of transmission to the UE. When the SeNB receives the stop message, the SeNB stops or suspends transmission to the UE. If the stop message includes the configuration related to a new key, the SeNB will use the new key to cipher data transmitted to the UE after the SeNB continues data transmission. Different from the prior art where the SeNB does not know the MeNB is initiating the handover of the UE, in the embodiment of the present invention, the source MeNB transmits the stop message to the SeNB to stop or suspend transmission from the SeNB during the handover procedure or in response to the handover decision. The step that the SeNB stops a transmission to the UE means that the SeNB may stop or suspend scheduling the UE, or stop or suspend transmitting a DL assignment and an UL grant to the UE via a PDCCH. The following examples are to illustrate the operating principle of the process 60.

Figure 7:
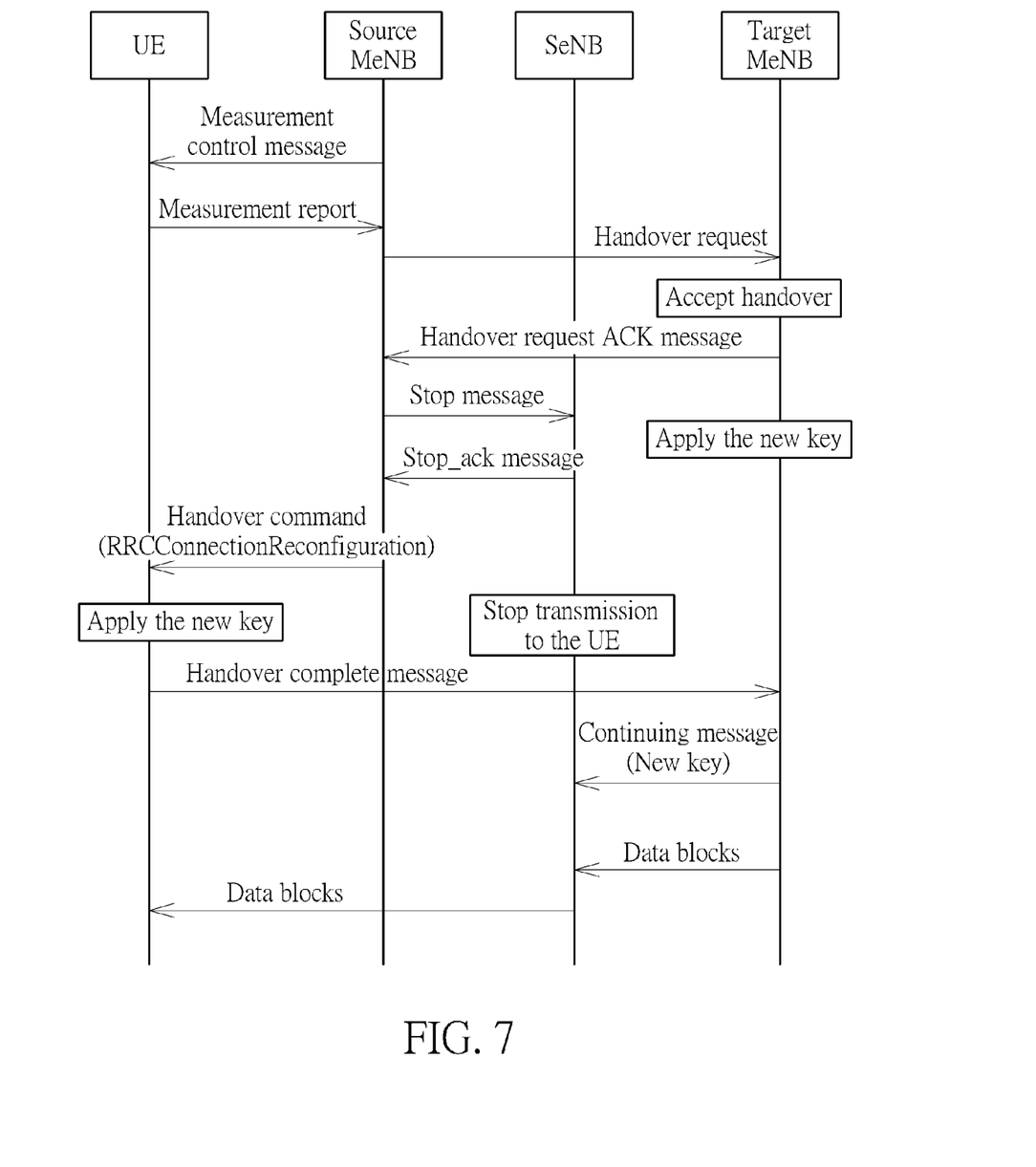
FIG. 7 is a schematic diagram of a handover procedure according to an embodiment of the present invention.

Please refer to FIG. 7, which is a schematic diagram of a handover procedure 70 according to an embodiment of the present invention. As shown in FIG. 7, the UE is connected to and served by the source MeNB and the SeNB simultaneously according to dual connectivity. Please refer to the description of FIG. 5 for FIG. 7 except that the source MeNB transmits a stop message to the SeNB and receives a stop acknowledgement (ACK) message from the SeNB, and the SeNB may receive a continuing message from the target MeNB. After receiving the handover request ACK message, the source MeNB may transmit the stop message to the SeNB to instruct the SeNB to stop or suspend a transmission to the UE.

Please note that the source MeNB transmits the handover command after receiving the handover request ACK message from the target MeNB or after transmitting the stop message to the SeNB. Different from the above embodiment in the process 40 where the handover command further instructs the UE to remove the at least one second cell, in the process 60, the handover command is a general handover command, where the UE performs a general handover procedure according to the handover command without removing any of the at least one second cell. Since the SeNB has stopped or suspended the transmission to the UE, the UE will not receive any data blocks via the at least one second cell until the SeNB continues the transmission. In an embodiment, in response to the stop message, the SeNB may reply to the source MeNB with an acknowledgement message (i.e., stop_ack message in FIG. 7) to acknowledge a reception of the stop message. Preferably, the source MeNB may transmit the handover command after receiving the stop_ack message. It should be noted that, before the source MeNB transmits the handover command to the UE, the source MeNB should ensure that the SeNB has stopped the transmission to the UE. In contrast, if the UE still receives data block(s) from the SeNB during the handover procedure (e.g. after the UE receives the handover command), the UE may likely use the new key to decipher the data block(s) ciphered by the original key, and thus fail to obtain the correct data. In this case, the data block(s) may be discarded.

During or before the handover procedure, the SeNB stops the transmission to the UE but the connection between the SeNB and the UE remains. Therefore, the target MeNB may desire to continue the transmission between the SeNB and the UE after the handover procedure is completed. As shown in FIG. 7, the target MeNB transmits a continuing message to the SeNB to instruct the SeNB to continue the transmission to the UE after the target MeNB receives the handover complete message from the UE, which indicates that the handover procedure is completed and the SeNB is able to continue the transmission. In response to the continuing message, the SeNB may continue the transmission to the UE. The continuing message may include necessary information for the SeNB to perform data transmission or reception with the UE. For example, the target MeNB may include parameters related to the new key in the continuing message, so that the SeNB can use the new key to cipher the data blocks to be transmitted. The parameters may include the new key or maybe used to derive the new key. Then, the SeNB may continue the transmission to the UE, wherein the transmitted data blocks can correctly be deciphered by the UE with the new key. Alternatively, there is no need for the target MeNB to transmit the continuing message. The handover command may indicate the UE to perform the synchronization procedure to the SeNB. The synchronization procedure maybe a random access procedure. The SeNB continues transmitting data when the SeNB detects the UE performs the synchronization procedure to the SeNB or after the SeNB detects the UE performs the synchronization procedure successfully.

Realization of the process 60 is not limited to the above description.

For example, in the above embodiments, the stop message is transmitted after the source MeNB receives the handover request ACK message from the target MeNB, so that the source MeNB can ensure that the target MeNB accepts the handover request from the source MeNB before the stop message is transmitted. In another embodiment, the source MeNB may transmit the stop message to the SeNB before transmitting the handover request message to the target MeNB or before receiving the handover request ACK message from the target MeNB. If the stop message is transmitted before the source MeNB transmits the handover request message or receives the handover request ACK message and the target MeNB rejects the handover request from the source MeNB, the source MeNB may transmit another message to the SeNB to continue the stopped transmission to the UE. In addition, in another embodiment, the target MeNB may transmits a stop message to the SeNB in response to the reception of the handover request message from the source MeNB so that the source MeNB does not need to transmit a stop message. In other words, via the handover request message, the source MeNB may request the target MeNB to notify the SeNB of the handover; this is not limited herein.

As mentioned above, in dual connectivity, the source MeNB may transmit DL data block(s) to the SeNB and the SeNB may forward the DL data block(s) to the UE. When the handover procedure is triggered, the source MeNB hands over the UE to the target MeNB and transmits the stop message to instruct the SeNB to stop the transmission to the UE. However, there may be some data block(s) transmitted to the SeNB which have not been forwarded to the UE yet. The data block(s) may be stored in a buffer of the SeNB, and have been ciphered by the original key. After the handover procedure is completed and the target MeNB transmits the continuing message to instruct the SeNB to continue the transmission to the UE, the SeNB may still transmit the data block(s) ciphered by the original key, but the data block(s) cannot be correctly deciphered by the UE with the new key. In order to avoid this problem, the SeNB may clear the data block(s) stored in the buffer in response to the stop message, wherein the data block(s) is received from the source MeNB but not transmitted to the UE yet. Therefore, after the handover procedure is completed, the SeNB will transmit new data blocks ciphered by the new key.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SoC), system in package (SiP), a computer on module (CoM), and the communication device 30.

To sum up, the present invention provides a method of handling handover for a network of a wireless communication system and a communication device. According to the present invention, the problem that the UE uses the new key to decipher the data block ciphered by the original key may not occur. The MeNB notifies the SeNB of the handover and the SeNB does not need to waste resources on transmitting data blocks which may not be correctly deciphered by the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling handover for a network of a wireless communication system, wherein a user equipment (UE) is connected to at least one first cell of a master base station and at least one second cell of a secondary base station of the network, the method comprising:
   when the master base station decides to hand over the UE to a target master base station of the network, transmitting, by the master base station, a first message to the secondary base station to instruct the secondary base station to release the at least one second cell; and
   receiving, by the master base station, a second message sent from the secondary base station in response to the secondary base station receiving the first message.

2. The method of claim 1, further comprising:
   transmitting, by the master base station, a handover command to the UE after the master base station receives a handover request acknowledgement message from the target master base station, after the master base station transmits the first message to the secondary base station, or after the master base station receives a second message sent from the secondary base station in response to the secondary base station receiving the first message, wherein the handover command instructs the UE to hand over to the target master base station and remove the at least one second cell of the secondary base station.

3. The method of claim 1, wherein the step of transmitting, by the master base station, the first message to the secondary base station to instruct the secondary base station to release the at least one second cell comprises:
   transmitting, by the master base station, the first message to the secondary base station to instruct the secondary base station to release the at least one second cell, after the master base station receives a handover request acknowledgement message from the target master base station, wherein the handover request acknowledgement message is transmitted in response to a handover request that the master base station sent to the target master base station.

4. The method of claim 1, wherein the secondary base station does not transmit data to the UE, does not schedule the UE, and does not transmit a downlink assignment and an uplink grant to the UE via a physical downlink control channel after the secondary base station releases the at least one second cell.

5. A method of handling handover for a network of a wireless communication system, wherein a user equipment (UE) is connected to at least one first cell of a master base station and at least one second cell of a secondary base station of the network, the method comprising:
when the master base station decides to hand over the UE to a target master base station of the network, transmitting, by the master base station, a first message to the secondary base station to instruct the secondary base station to stop transmission to the UE;
transmitting, by the master base station, a handover command to the UE after the master base station receives a handover request acknowledgement message from the target master base station, after the master base station transmits the first message to the secondary base station, or after the master base station receives a second message sent from the secondary base station in response to the secondary base station receiving the first message; and
when the target master base station receives a handover complete message in response to the handover command from the UE, transmitting, by the target master base station, a third message to the secondary base station to instruct the secondary base station to continue the transmission to the UE.

6. The method of claim 5, further comprising:
clearing, by the secondary base station, at least one data block for the UE received from the master base station in response to the first message.

7. The method of claim 5, further comprising:
receiving, by the master base station, a second message sent from the secondary base station in response to receiving the first message.

8. The method of claim 5, wherein the step of transmitting, by the master base station, the first message to the secondary base station to instruct the secondary base station to stop a transmission to the UE comprises:
transmitting, by the master base station, the first message to the secondary base station to instruct the secondary base station to stop scheduling the UE or stop transmitting a downlink assignment and an uplink grant to the UE via a physical downlink control channel.

9. A communication device for handling handover for a network of a wireless communication system, wherein a user equipment (UE) is connected to at least one first cell of a master base station and at least one second cell of a secondary base station of the network, the communication device installed in the master base station and comprising:
a processor, for executing a process corresponding to a program code; and
a memory, coupled to the processor, for storing the program code, wherein the process comprises:
when the master base station decides to hand over the UE to a target master base station of the network, transmitting a first message to the secondary base station to instruct the secondary base station to release the at least one second cell; and
receiving a second message sent from the secondary base station in response to the secondary base station receiving the first message.

10. The communication device of claim 9, wherein the process further comprises:
transmitting a handover command to the UE after the master base station receives a handover request acknowledgement message from the target master base station, after the master base station transmits the first message to the secondary base station, or after the master base station receives a second message sent from the secondary base station in response to the secondary base station receiving the first message, wherein the handover command instructs the UE to hand over to the target master base station and remove the at least one second cell of the secondary base station.

11. The communication device of claim 9, wherein the process further comprises:
transmitting a handover command to the UE after the master base station receives the second message, wherein the handover command instructs the UE to hand over to the target master base station and remove the at least one second cell of the secondary base station.

12. The communication device of claim 9, wherein the step of transmitting the first message further comprises:
transmitting the first message to the secondary base station to instruct the secondary base station to release the at least one second cell after the master base station receives a handover request acknowledgement message from the target master base station, wherein the handover request acknowledgement message is transmitted in response to a handover request that the master base station sent to the target master base station.

* * * * *